United States Patent [19]
Nakagawa et al.

[11] Patent Number: 6,104,826
[45] Date of Patent: Aug. 15, 2000

[54] METHOD OF WATERMARK-EMBEDDING/EXTRACTING IDENTIFICATION INFORMATION INTO/FROM PICTURE DATA AND APPARATUS THEREOF, AND COMPUTER READABLE MEDIUM

[75] Inventors: Akira Nakagawa; Kimihiko Kazui; Atsuko Tada; Eishi Morimatsu; Koich Tanaka, all of Kawasaki, Japan

[73] Assignee: Fujitsu Limited, Kawasaki, Japan

[21] Appl. No.: 08/948,083

[22] Filed: Oct. 9, 1997

[30] Foreign Application Priority Data

Feb. 19, 1997 [JP] Japan ..................................... 9-035258

[51] Int. Cl.$^7$ ...................................................... G06K 9/00
[52] U.S. Cl. ........................................... 382/100; 382/248
[58] Field of Search ..................................... 382/232, 100, 382/238; 380/4, 34, 55, 23, 54, 287, 210

[56] References Cited

U.S. PATENT DOCUMENTS 5,848,155  12/1998  Cox ............................................ 382/191
5,930,369   7/1999  Cox et al. .................................. 380/54

OTHER PUBLICATIONS

F.M. Boland J. J.K. O Rugnaidh and C. Dautzenberg "Watermarking Digital Images for Copyright Protection" Image Processing and its Applications Jul. 4–6 1995, Conference Publication No. 410 IEEE 1995 pp. 326–330, Apr. 1996.

Takeshi Ogihara et al. "Data Embedding into Pictorial Images with less Distortion Using Discrete Cosine Transform" Proceedings of ICPR '96 1015–4651/96 IEEE 1996 pp. 675–679.

Yasuhiro Nakamura et al. A Unified Cooling Method of Image and Text Data Using Discrete Cosine Transition Systems and Computers in Japan, vol. 21, No. 3, 1990 pp. 87–92, 1990.

Adriang Bors et al "Image Watermarking Using DCT Domain Constraint" IEEE 1996 Department of Informatics, University of Thessaloniki Greece, pp. 231–234, 1996.

I.J. Cox et al., "Secure Spread Spectrum Watermarking for Images, Audio and Video", 1996, pp. 243–246, Proceedings of the Int'l Conference of Image Processing, IEEE.

J.J.K.O. Ruanaidh et al., "Watermarking Digital Images for Copyright Protection", Aug. 1996, vol. 143, No. 4, pp. 250–256, IEE Proceedings: Vision, Image & Signal Processing, GB, Institute of Electrical Engineers.

Kineo Matsui et al., "Video–Stenography: How to Secretly Embed a Signature in a Picture", Jan. 1994, vol. 1, No. 1, Jan. 1994, pp. 187–206, IMA Intellectual Property Project Proceedins.

Jian Zhao et al., "Embedding Robust Labels Into Images for Copyright Protection", 1995, pp. 242–251, Proceedings of the Knowright. Conference. Proceedings of the Int'l Congress on Intellectual Property Rights for Specialized Information, Knowledge and New Technology.

*Primary Examiner*—Andrew W. Johns
*Assistant Examiner*—Shervin Nakhjavan
*Attorney, Agent, or Firm*—Staas & Halsey, LLP

[57] ABSTRACT

The present invention relates to methods for watermark-embedding/extracting identification information into/from picture data and apparatuses thereof. When identification information is watermark-embedded, the following steps are performed. Combinations of basis functions orthogonal each other are generated in association with each numerical signal. For each combination of the orthogonal basis functions, a weight coefficient is calculated so as to correspond to the combination of the basis functions by calculating a sum of products of values of the basis functions for pixels in the original picture data and pixel values of the pixels. For each numerical signal, a watermark-embedding function is referred, a input value is specified, and a pixel value is changed. When the identification information is extracted from the picture data, for each weight coefficient, the watermark-embedding function is referred, and the value of the watermark-embedding function is calculated for each weight coefficient.

17 Claims, 11 Drawing Sheets

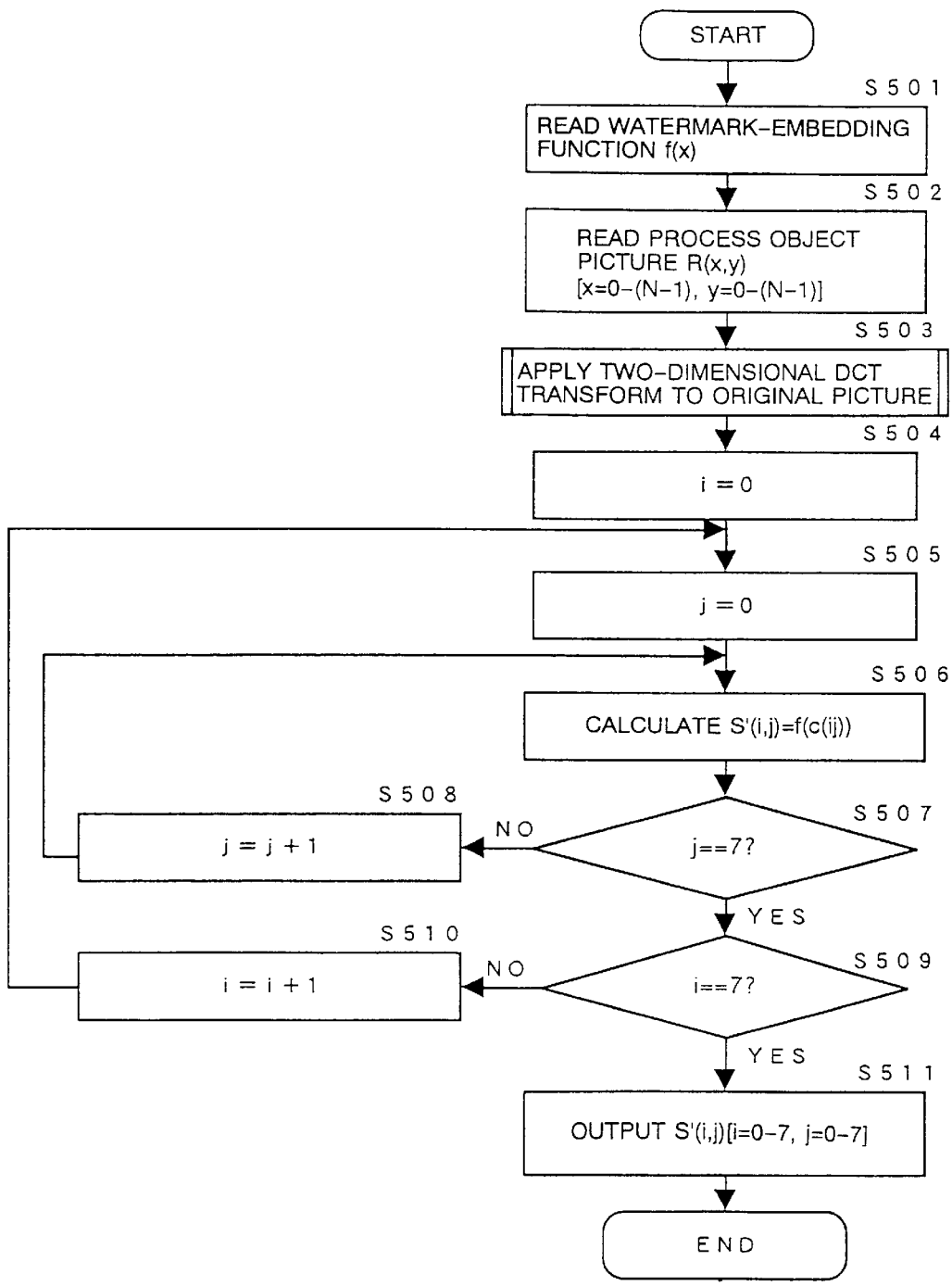

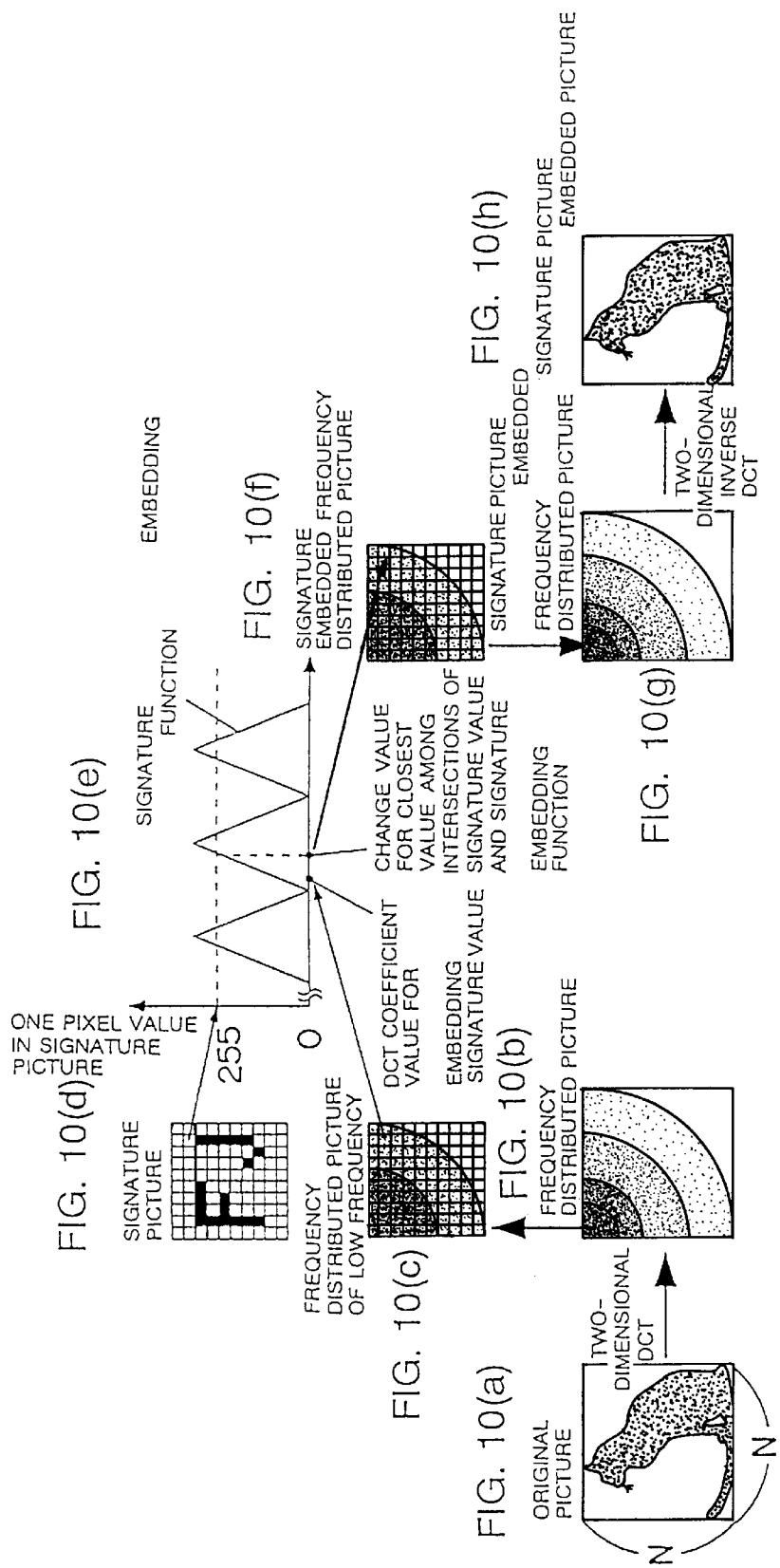

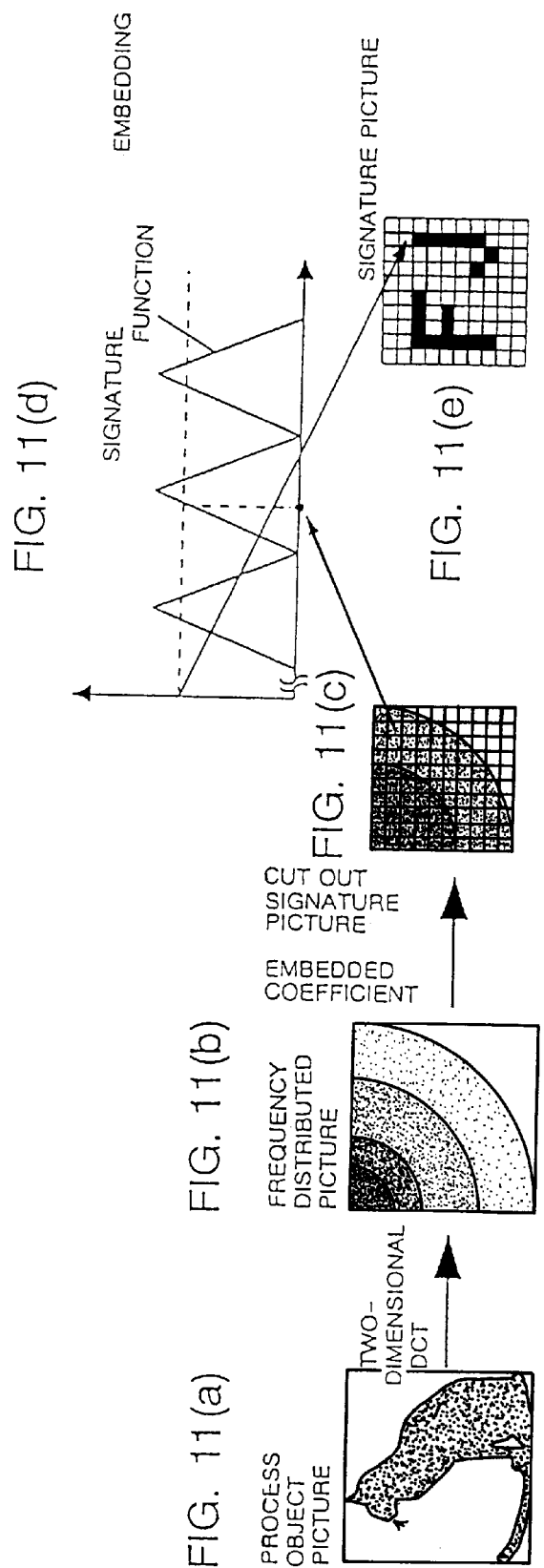

METHOD OF WATERMARK-EMBEDDING/ EXTRACTING IDENTIFICATION INFORMATION INTO/FROM PICTURE DATA AND APPARATUS THEREOF, AND COMPUTER READABLE MEDIUM

BACKGROUND OF THE INVENTION

1. Field of the Invention

The present invention relates to technology for watermark-embedding identification information indicating a person who has a right of copyright or the like into digital picture data distributed via various media such as circuits, and relates to technology for extracting identification information from those digital picture data.

2. Description of the Related Art

As digital technology and multi-media public advance in recent years, various data are converted into digital data and are distributed broadly via media such as a communication network, a satellite communication and a CD-ROM (Compact Disk Read Only Memory). When digital data are distributed in this multi-media public, it is not possible to avoid problems concerning copies of digital data.

When a copy of digital data is lawful, it may help the culture in the multi-media public. When, however, the copy is unlawful such as used directly for business, there is a possibility that the copy causes an enormous profit loss for a person who has a right (such as an author, a copyrighter, a copyright holder, a person who has neighboring right) since it is possible to copy digital data without deterioration.

Conventionally, technology is proposed in that identification information is watermark-embedded into picture data in a manner that it is difficult to recognize it by appearances, and the identification information is used as evidence when this picture data is copied unlawfully. For example, the following technology is proposed by J. Cox et al. in "Secure Spread Spectrum Watermarking for Multimedia", NEC Research Institute, Technical Report 95-10. That is, according to this technology, orthogonal transformation is applied to picture data, plural weight coefficients corresponding to dot positions of the identification information are selected among the weight coefficients of basis function obtained by the transformation, dot values of the identification information are respectively added to the selected weight coefficients, and the inverse orthogonal transformation is applied to all weight coefficients including the added coefficients, as the result, identification information watermark-embedded picture data is generated.

In the above-mentioned conventional technology, however, since the weight coefficients obtained by the orthogonal transformation of original picture data (before watermark-embedding identification-information) may be various values, it is not possible to specify weight coefficients to which dot values of the identification information are respectively added among the weight coefficients obtained by the orthogonal transformation of the identification information watermark-embedded picture data. Thus, to enforce the above-mentioned technology, it is necessary to keep and to manage each pair of original picture data and identification information watermark-embedded picture data, and when a copy appears, it is necessary to extract each dot value of identification information by subtracting each weight coefficient obtained by the orthogonal transformation of the kept and managed original data from each weight coefficient obtained by the orthogonal transformation of the kept and managed identification information watermark-embedded picture data and to extract each dot value of identification information by subtracting each weight coefficient obtained by the orthogonal transformation of the original picture data from each weight coefficient obtained by the orthogonal transformation of the copy, thereafter, it is necessary to prove the identify about both identification information.

According to the conventional technology, it is necessary to keep and to manage both identification information watermark-embedded picture data and original picture data twice, therefore, there are problems in that a data management and a proof to detect a copy are troublesome and twice storage are necessary compared with distributed data quantity. These problems are serious, particularly in a database in which data must be updated frequently, such as a database dealing picture data about 1000 pieces and a database for newspapers.

To avoid this twice data management, it is also considered that a part of the weight coefficient obtained by the orthogonal transformation of the original data is permutated by the just value of the identification information. There are possibilities in that this permutation causes a remarkable deterioration of the picture quality after the inverse orthogonal transformation, and in that the identification information is immediately recognized by a reproducer only by the orthogonal transformation of the picture data and then data is rewritten.

SUMMARY OF THE INVENTION

Accordingly, it is an object of the present invention to provide a method and an apparatus for watermark-embedding identification information into picture data, wherein identification information can be extracted from identification information watermark-embedded picture data without original picture data and identification information can be watermark-embedded into picture data without deteriorating the picture quality so as not to be recognized by a reproducer, to provide a method and an apparatus for extracting identification information from the picture data in which the identification information is watermark-embedded by those method and apparatus, and to provide a computer readable medium storing a program to make a computer function as an identification information watermark-embedding and/or extracting apparatus.

The preset invention is achieved to solve the above-mentioned problems.

That is, the first aspect of the present invention relates to an identification information watermark-embedding method for watermark-embedding identification information into original picture data consisting of pixel values which are arranged in a matrix. The numerical signals is not more than the pixel values. In the identification information watermark-embedding method, combinations of basis functions orthogonal each other are generated in association with each of the numerical signals (S1), weight coefficients are calculated so as that each of weight coefficients corresponds to each of the combinations of the basis functions by calculating, for each of the combinations of the basis functions, a sum of products, each of which are calculated for each of the pixels, based on a value of each of the basis functions for a position of the pixel within the original picture data and a pixel value of the pixel (S2), for each of the numerical signals, a watermark-embedding function which is a multi-to-one function taking available values of the weight coefficients in a domain and taking available values of the numerical signals in a range is referred, and a input value of the watermark-embedding function closest to the weight coefficients corresponding calculated for the combinations of the basis functions associated with the numerical signal is specified among plural input values of the watermark-embedding function outputting a numerical value of the numerical signal (S3), pixel values in the original data are changed so that each of the weight coefficients becomes a value equal to the input value which is specified (S4).

According to the present invention, the numerical information of the identification information is not directly watermark-embedded into the weight coefficient, but the input value closest to the original weight coefficient is changed for the weight coefficient among the plural input values which the numerical information is the output value in the watermark-embedding function. Thus, the difference of the weight coefficient before and after changing becomes very small. As the result, there is little case that the picture quality of the picture data after changing the pixel value deteriorates. Further, since the weight coefficient after changing the pixel value corresponds to one numerical value of the numerical information to be identification information by the watermark-embedding function, the identification information can be extracted from the picture data after changing the picture value. Moreover, though third persons calculate the weight coefficient, they can not detect which value corresponds to each weight coefficient without the watermark-embedding function. Thus, since the third persons can not know contents of the identification information, they can not modify the identification information.

The pixel value in the original picture data may be a luminance value of each color signal in RGB signal, a luminance value in YCC signal or a color difference value in YCC signal.

The dot number in the original picture data may be set so as to be equal or different lengthwise and breadthwise.

The available numerical value of each numerical value signal in the identification information may be binary or more than.

The numerical signals in the identification information may be arranged in a line or may be picture information arranged in a matrix.

The weight coefficient may be calculated only for a combination of basis functions corresponding to each numerical signal in the identification information, or may be calculated for all combinations of basis functions by the orthogonal transformation. According to the former, the total of the calculation process for the weight coefficient reduces. According to the latter, it is possible to change the pixel value of the picture data only by applying the inverse orthogonal transformation to all weight coefficient after permutating the weight coefficient for the combination of the basis functions corresponding to each numerical signal in the identification information. As this orthogonal transformation, a two-dimensional discrete cosine transformation, a two-dimensional discrete sine transformation, or a Hadamard transformation may be used.

The watermark-embedding function may be held by functional expressions or by tables providing relations of one output value for plural input values. The watermark-embedding function may be a periodic function or not, as long as a multi-one function is used. When a periodic function is used, functional expressions become simple, therefore, it is possible to simplify an apparatus to carry out the present invention. That is, only if a intersection with a value of each numerical signal of the identification information in one period of the watermark-embedding function is obtained, it becomes easy to specify input values because there are solutions at points that the intersection is shifted by times of whole numbers. Additionally, from points of the picture quality in the picture data after changing the pixel values, it becomes subjectively difficult to watch errors by this change for components of which weight coefficients are larger. The change degrees are larger, resistance for various picture data change becomes stronger. To make the change degree large, a period of the watermark-embedding function may be made long. Thus, a watermark-embedding function may be used in which the period becomes long in accordance with that the value of the weight coefficient becomes large in a manner that the weight coefficient is changed to a larger value for a larger weight coefficient, and the weight coefficient is changed to a small value for a smaller weight coefficient.

The second aspect of the present invention relates to an identification information extracting method for extracting identification information from process object picture data into which identification information is watermark-embedded by the identification information watermark-embedding method according to the first aspect. In the identification information extracting method, combinations of basis functions orthogonal each other is generated in association with each of the numerical signals. For each of the combinations of the orthogonal basis functions, weight coefficients are calculated so that each of weight coefficients corresponds to each of the combinations of the basis functions by calculating a sum of products, each of which are calculated, for each of the pixels, based on a value of each of the basis functions for a position of the pixel in the original picture data and a pixel value of the pixel. Then, for each of the weight coefficients, a watermark-embedding function which is a multi-to-one function taking available values of the weight coefficients in a domain and taking available values of the numerical signals in a range is referred and a value of the watermark-embedding function for each of the weight coefficients is calculated.

The third aspect of the present invention relates to an identification information watermark-embedding method for watermark-embedding identification information into original picture data consisting of pixel values which are arranged in a matrix. The identification information consists of numerical signals not more than the pixel values. In the identification information watermark-embedding method, orthogonal transformation is applied to each of pixel values, and coefficient distributed data consisting of weight coefficients which are arranged in a matrix is generated, each of weight coefficients selected from the coefficient distributed data is related with one of the numerical signals. For each of the numerical signals, a watermark-embedding function which is a multi-to-one function taking available values of the weight coefficients in a domain and taking available values of the numerical signals in a range is referred, an input value of the watermark-embedding function to the weight coefficients related with the numerical signal is specified among plural input values of which output values correspond to a numerical value of one of the numerical signal, and the weight coefficients in the coefficient distributed data related with the numerical signal is permutated by the input value. Then, inverse orthogonal transformation is applied to the coefficient distributed data after permutating the weight coefficients for all of the numerical signals.

The fourth aspect of the present invention relates to an identification information extracting method for extracting identification information from process object picture data to which the identification information is watermark-embedded by the identification information watermark-embedding method according to the third aspect. In the identification information extracting method, orthogonal transformation is applied to each pixel values and coefficient distributed data consisting of weight coefficients which are arranged is generated in a matrix, weight coefficients corresponding to each of the numerical signals are picked up from the coefficient distributed data. For each of the weight coefficients which are picked up, a watermark-embedding function which is a multi-to-one function taking available values of the pickup weight coefficients in a domain and taking available values of the numerical signals in a range is referred, and a value of the watermark-embedding function for the each of the weight coefficients which are picked up is calculated.

The fifth aspect of the present invention relates to an identification information watermark-embedding method for watermark-embedding identification information into original picture data consisting of pixel values which are arranged in a matrix. The identification information consists of numerical signals not more than the pixel values. In the identification information watermark-embedding method, two-dimensional discrete cosine transformation is applied to each of pixel values, and generating coefficient distributed data consisting of weight coefficients which are arranged in a matrix, each of weight coefficients selected from the coefficient distributed data is related with one of the numerical signals. For each of the numerical signals, a watermark-embedding function which is a multi-to-one function taking available values of the selected weight coefficients in a domain and taking available values of the numerical signals in a range is referred, an input value closest to the weight coefficients related with the numerical signals is specified among plural input values which output values correspond to a numerical value of the numerical signal, and the weight coefficients in the coefficient distributed data related with the numerical signal is permutated by the closest input value. Then, inverse two-dimensional discrete cosine transformation is applied to the coefficient distributed data after permutating the weight coefficients for all of the numerical signals.

The sixth aspect of the present invention relates to an identification information extracting method for extracting identification information from process object picture data into which the identification information is watermark-embedded by the identification information watermark-embedding method according to the fifth aspect. In the identification information extracting method, two-dimensional discrete cosine transformation is applied to each pixel values, and coefficient distributed data consisting of weight coefficients which are arranged in a matrix is generated. Weight coefficients corresponding to the numerical signals are picked up from the coefficient distributed data. For each of the weight coefficients which are picked up, a watermark-embedding function which is a multi-to-one function taking available values of the weight coefficients in a domain and taking available values of the numerical signals in a range is referred, and a value of the watermark-embedding function for the each of the weight coefficients which are picked up is calculated.

The seventh aspect of the present invention relates to an identification information watermark-embedding method according to the first, third, or fifth aspect, and is specified by that the watermark-embedding function is a period function.

The eighth aspect of the present invention relates to an identification information extracting method according to the second, fourth, or sixth aspect, and is specified by that the watermark-embedding function is a period function.

The ninth aspect of the present invention relates to an identification information watermark-embedding method according to the first, third, or fifth aspect, and is specified by that the watermark-embedding function is a continuous period function.

The tenth aspect of the present invention relates to an identification information extracting method according to the second, fourth, or sixth aspect, and is specified by that the watermark-embedding function is a continuous period function.

The eleventh aspect of the present invention relates to an identification information watermark-embedding method according to the first, third, or fifth aspect, and is specified by that the watermark-embedding function makes an interval between the plural input values taking one output value narrow when an input value is low, and makes the interval broad when the input value is high.

The twelfth aspect of the present invention relates to an identification information extracting method according to the second, fourth, or sixth aspect, and is specified by that the watermark-embedding function makes an interval between the plural input values taking one output value narrow when an input value is low, and makes the interval broad when the input value is high.

The thirteenth aspect of the present invention relates to an identification information watermark-embedding apparatus of watermark-embedding identification information into original picture data consisting of pixel values which are arranged in a matrix. The identification information consists of numerical signals not more than the pixel vales. The identification information watermark-embedding apparatus comprises a watermark-embedding function hold unit for holding a watermark-embedding function which is a multi-to-one function taking available values of the weight coefficients in a domain and taking available values of the numerical signals in a range, an orthogonal transformation unit for applying orthogonal transformation to each of pixel values, and generating coefficient distributed data consisting of weight coefficients which are arranged in a matrix, a weight coefficient permutation unit for relating each of weight coefficients selected from the coefficient distributed data with one of the numerical signals, specifying an input value closest to the weight coefficients related with the numerical signals among plural input values of the watermark-embedding function outputting a numerical value of the numerical signal, and permutating the weight coefficient in the coefficient distributed data by the closest input value, and an inverse orthogonal transformation unit for applying inverse orthogonal transformation to the coefficient distributed data which the weight coefficients are permutated.

The fourteenth aspect of the present invention relates to an identification information extracting apparatus for extracting identification information from process object picture data into which the identification information is watermark-embedded by the identification information watermark-embedding apparatus according to the thirteenth aspect. The identification information extracting apparatus comprises a watermark-embedding function hold unit for holding a watermark-embedding function which is a multi-to-one function taking available values of the weight coefficients in a domain and taking available values of the numerical signals in a range, an orthogonal transformation unit for applying orthogonal transformation to each of pixel values and generating coefficient distributed data consisting of weight coefficients which are arranged in a matrix, a pickup unit for picking up weight coefficients corresponding to each of the numerical signals from the coefficient distributed data, and a calculation unit for calculating a value of the watermark-embedding function for each of the weight coefficients which are picked up.

The fifteenth aspect of the present invention relates to a computer readable medium storing a program to control a computer. The program performs a step of applying orthogonal transform to each of pixel values and generating coefficient distributed data consisting of weight coefficients which are arranged in a matrix; a step of relating each of weight coefficients selected from the coefficient distributed data with the numerical signals; a step of, for each of the numerical signals, referring to a watermark-embedding function which is a multi-to-one function taking available values of the weight coefficients in a domain and taking available values of the numerical signals in a range, specifying an input value closest to weight coefficients related with the numerical signals among plural input values of the watermark-embedding function outputting a numerical value of the numerical signal, and permutating the weight coefficients in the coefficient distributed data by the closest input value; and a step of applying inverse orthogonal transformation to the coefficient distributed data after permutating the weight coefficients for all of the numerical signals.

The sixteenth aspect of the present invention relates to a computer readable medium storing a program to control a computer. The program performs a step of applying orthogonal transform to each pixel values, and generating coefficient distributed data consisting of weight coefficients which are arranged in a matrix; a step of picking up weight coefficients corresponding to the numerical signals from the coefficient distributed data; and a step of, for each of the weight coefficients which are picked up, referring to a watermark-embedding function which is a multi-to-one function taking available values of the pickup weight coefficients in a domain and taking available values of the numerical signals in a range and calculating a value of the watermark-embedding function for the each of the pickup weight coefficients.

BRIEF DESCRIPTION OF THE DRAWINGS

Other objects and advantages of the present invention will become apparent during the following discussion conjunction with the accompanying drawings, in which:

FIG. 9 is a flow chart illustrating an identification information extracting process in the Embodiment;

FIGS. 10($a$) through 10($h$) are explanatory views illustrating a flow of a signature picture watermark-embedding process in the Embodiment; and FIG. 11($a$) through 11($e$) are explanatory views illustrating a flow of a signature picture extracting process in the Embodiment.

DETAILED DESCRIPTION OF THE PREFERRED EMBODIMENTS

Figure 1:
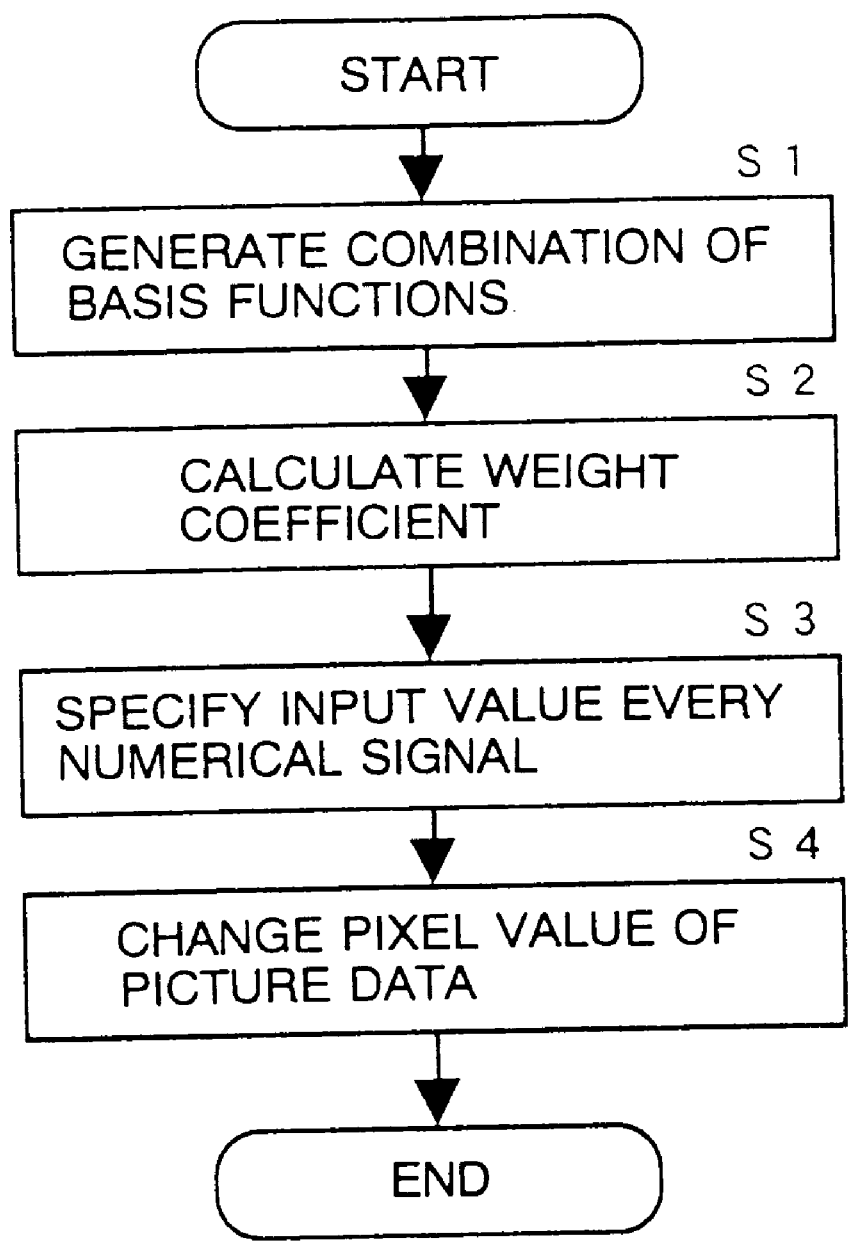
FIG. 1 is a view illustrating a principal of the present invention.

Preferred aspects and embodiments of the present invention will now be described with reference to the accompanying drawings.

A watermark-embedding computer according to an aspect of a method and an apparatus for watermark-embedding identification information into image data and an extracting computer according to an aspect of a method and an apparatus for extracting identification information from image data according to the present invention are structured in a manner that conventional various orthogonal transformation processes and inverse orthogonal transformation processes can be used, and any original picture and identification information of various sizes can be processed (only, identification information≦original picture).

[Outline of Identification Information Watermark-embedding and Extracting]

First, explanations are given of outlines of watermark-embedding identification information into picture data and of extracting identification information from into identification information watermark-embedded picture data before explaining a concrete structure in this aspect.

Now, it is assumed that original picture data (such as monochrome picture data or luminance data extracted from NTSC color picture data) to be an identification information watermark-embedded object is structured by N×N pixels. It is also assumed that the identification information to be a watermark object is data including L (L≦N×M) signals to which predetermined values are respectively given.

The watermark-embedding computer applies the orthogonal transformation to all of the above-mentioned original picture data or to each of plural blocks obtained by dividing the original picture data (only, not less than L pixels in each block). The original picture is divided and the orthogonal transformation is applied to those, because a signature picture can be extracted without deterioration though a picture to which a watermark-embedding process is applied is cut off partially and copied. Incidentally, when a size of each partial picture is made too small, the picture to which the watermark-embedding process is applied deteriorates, therefore, it is preferable that each partial picture is not less than 8×8 pixels.

For the orthogonal transformation, L combinations of basis functions which are orthogonal one another in relation to each signal of the identification information are prepared. Each weight coefficient of combinations of basis functions is obtained by calculating a sum of products of a value of each basis function orthogonal to a position of each pixel in the original picture data and a luminance value thereof for each combination of basis functions. Incidentally, "orthogonal" indicates that directions of variables of each basis function are orthogonal one another in an original picture or a block including N×M pixels.

Then, the watermark-embedding computer watermarks each value of the signal included in the identification information into each weight coefficient for the combination of basis functions which are previously related. At that time, the watermark-embedding computer does not directly add/write a value of each signal to/over a weight coefficient, but prepares a predetermined watermark-embedding function every signal and permutates a value corresponding to each signal for an original weight coefficient by this watermark-embedding function.

The watermark-embedding function prepared every signal may be defined so as to be different every signal or may be defined in common for signals. In any case, each watermark-embedding function includes a value of a weight coefficient within a defined range, and includes a value of each signal in the identification information within a numerical range. Each watermark-embedding function is a multi-one function in which plural input values in the defined range correspond to the same output value. Concretely, a process becomes simple when a simple function is used, therefore, it is desirable to use a periodic function (a continuous periodic function in which an interval between plural input values to be the same output value is narrow when the input value is small and the interval is broad when the input value is large) indicated by the following expression (1) and so on.

$$f(x) = A \cdot \sin\left(\frac{x}{T}\right) \quad (1)$$

The watermark-embedding computer, every signal in the identification information, inverse-calculates all input values in the watermark-embedding function in which a value of that signal is taken for a output value. Then, the watermark-embedding computer specifies an input value which has the smallest difference from the weight coefficient of the combination of the basis functions previously corresponded to the signal among all calculated input values, and permutates the specified input value for the original weight coefficient value.

Thereafter, the watermark-embedding computer rewrites a value of each pixel in the original picture data or in the block in a manner that each original weight coefficient of the combination of basis functions after the orthogonal transformation becomes a permutated value. Identification information watermark-embedded picture data is obtained in this way. As above mentioned, since the variation by permutating the weight coefficient is limited to the minimum, the deterioration of the identification information watermark-embedded picture data is kept to the minimum. Further, although a third person applies the orthogonal transformation to the identification information watermark-embedded picture data, the person can not know each signal value of the identification information in a case that the watermark-embedding function is not known, therefore, it is not possible to change the identification information.

The extracting computer applies the orthogonal transformation to all of process object picture data or to each of plural blocks obtained by dividing the process object picture data (only, not less than L pixels in each block). At that time, as well as for the case that the identification information is watermark-embedded into the original picture data, L combinations of basis functions which are orthogonal to one another in relation to each signal of the identification information are available. Each weight coefficient of the combination of basis functions is obtained by calculating a sum of products of respective values of basis functions orthogonal to positions of pixels in the process object picture data and luminance values thereof for combinations of basis functions. Incidentally, as basis functions, the same functions for watermark-embedding the identification information into the original picture data are used.

The extracting computer inputs each obtained weight coefficient into the corresponding watermark-embedding function so as to obtain an output value. Then, each obtained output value of the watermark-embedding function is arranged in accordance with the order of the signals in the identification information which are previously related with the corresponding weight coefficients. Then, when the process object picture data is the identification information watermark-embedded picture data, the arranged output values coincide with the identification information. In this way, the extracting computer can extract the identification information from the identification information watermark-embedded picture data without original picture data only with each watermark-embedding function. The watermark-embedding function may be used for various original picture data in common. Thus, the total of data to be kept and managed reduces exceedingly compared with the conventional approach.

[Structure of Watermark-embedding Computer]

Figure 2:
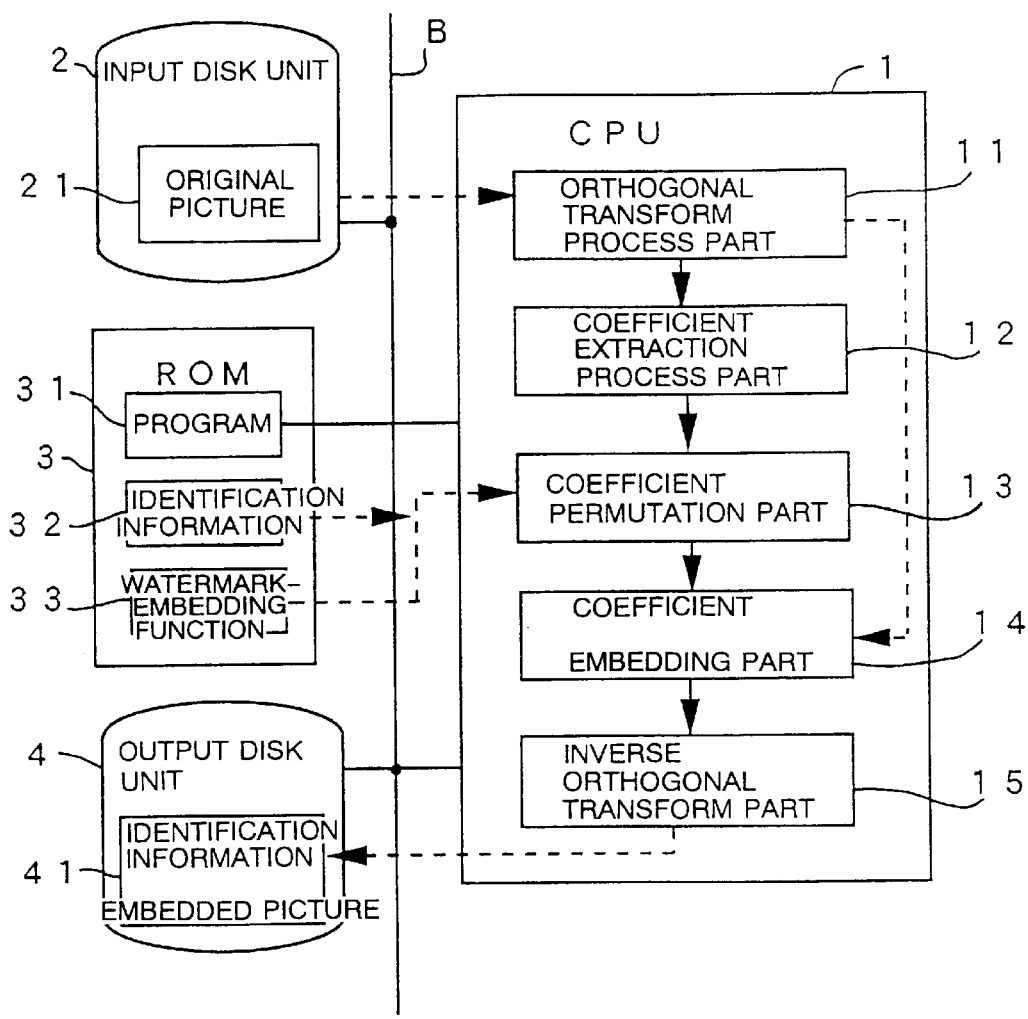
FIG. 2 is a block diagram illustrating an outline structure of a watermark-embedding computer according to the aspect of the present invention.

Next, an explanation is given of a concrete structure of the watermark-embedding computer. FIG. 2 is an outline block diagram illustrating only a structure relative to a process for watermark-embedding identification information into original picture data in hardware of this watermark-embedding computer. As shown in FIG. 2, the watermark-embedding computer is provided with a CPU (Central Processing Unit) 1, an input disk unit 2, a ROM (Read Only Memory) 3 and an output disk unit 4 which are connected one another by a bus B.

The input disk unit 2 inputs original picture data 21 into the CPU 1 in accordance with an instruction from the CPU 1, such as a hard disk unit, a floppy disk unit, or an optical magnetic disk unit.

The ROM 3 used as a watermark-embedding function hold unit and a computer readable medium is a read only memory holding an identification information watermark-embedding program 31 executed in the CPU 1, identification information 32 and a watermark-embedding function 33.

Figure 3:
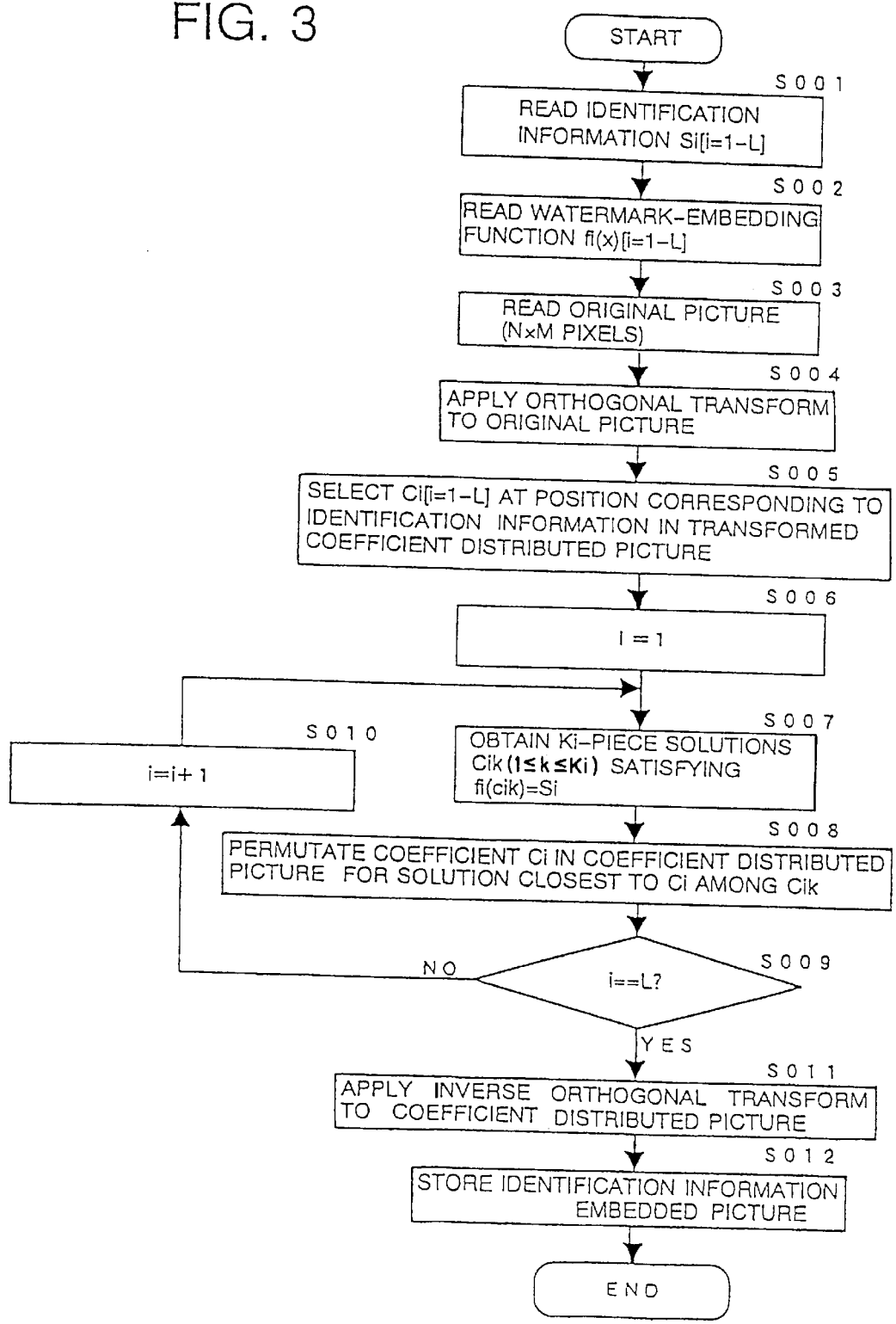
FIG. 3 is a flow chart illustrating an identification information watermark-embedding process executed by the CPU 1 in FIG. 2.

The CPU 1 is a processor controlling all of the watermark-embedding computer. The identification information watermark-embedding program 31 read from the ROM 3 runs, whereby an orthogonal transformation process part 11, a coefficient extraction process part 12, a coefficient permutation part 13, a coefficient watermark-embedding part 14 and an inverse orthogonal transformation part 15 are implemented in the CPU 1, and the identification information watermark-embedding process shown in FIG. 3 is executed. Dot lines in FIG. 2 indicate data flows in the CPU 1.

The orthogonal transformation process part 11 used as an orthogonal transformation unit applies the orthogonal transformation to the original picture data 21 of N×M pixels read from the input disk unit 2, and then calculates a weight coefficient for each of N×M combinations of the basis functions. The N×M weight coefficients forms a N×M matrix similarly to the original picture. The matrix of those weight coefficients, hereinafter, is called "coefficient distributed picture data" for convenience. The orthogonal transformation process part 11 informs both the coefficient extraction process part 12 and the coefficient watermark-embedding part 14 of this coefficient distributed picture data.

The coefficient extraction process part 12 extracts L weight coefficients to which signals of identification information are respectively watermark-embedded from the coefficient distributed picture data informed from the orthogonal transformation process part 11, and informs the coefficient permutation part 13 of them.

The coefficient permutation part 13 used as a coefficient permutation unit reads the identification information 32 and the watermark-embedding function 33 from the ROM 3. Then, the watermark-embedding function 33 is inverse-calculated every signal of the identification information 32, and then all input values, which take the output value for the value of the signal, of the watermark-embedding function 33 are obtained. Then, the coefficient permutation part 13 specifies an input value which has the smallest difference from the corresponding weight coefficient informed from the coefficient extraction process part 12 among the obtained input values, and informs the coefficient watermark-embedding part 13 of the specified input value as a rewrite value for that coefficient.

The coefficient watermark-embedding part 14 used as a coefficient watermark-embedding unit writes this rewrite value over the weight coefficient corresponding to the rewrite value informed from the coefficient watermark-embedding part 13 in the coefficient distributed picture data received from the orthogonal transformation process part 11.

The inverse orthogonal transformation part 15 used as an inverse orthogonal transformation unit applies the inverse orthogonal transformation to the N×M weight coefficients received from the coefficient watermark-embedding part 14. The inverse orthogonal transformation part 15, every pixel in the identification information watermark-embedded picture, calculates a total of products of each weight coefficient corresponding to each combination of the basis functions used in the orthogonal transformation part 11 and each value of basis function corresponding to the position of that pixel, and then obtains a luminance value of that pixel. The inverse orthogonal transformation part 15 sends an identification information watermark-embedded picture data 41 including each pixel of which the luminance value is obtained like this to the output disk unit 4.

In the output disk unit 4, such as a hard disk unit, a floppy disk unit and an optical magnetic disk unit, the identification information watermark-embedded picture data 41 received from the CPU 1 is written.

FIG. 3 is a flow chart illustrating an identification information watermark-embedding process performed by the CPU 1 which has read the identification information watermark-embedding program 31. The identification information watermark-embedding process starts by inputting an identification information watermark-embedding command via a keyboard (not shown) connected to the watermark-embedding computer.

In S001 executed initially after starting the identification information watermark-embedding process, the CPU 1 reads L signals $S_i$ [i=1–L] to be in the identification information 32 from the ROM 3.

In S002, the CPU 1 reads L watermark-embedding functions 33 ($f_i(x)$[i=1–L]) from the ROM 3.

In S003, the CPU 1 reads original picture data of N×M pixels from the input disk unit 2.

In S004, the CPU 1 applies the above mentioned orthogonal transformation process to all of the original picture data read in S003 so as to generate coefficient distributed picture data of N×M dots.

In S005, the CPU 1 selects a weight coefficient $C_i$ [i=1–L] corresponding to each signal $S_i$[i=1–L] read in S001 among weight coefficients included in the coefficient distributed picture data generated in S004.

In S006, the CPU 1 initializes a variable i to specify the weight coefficient $C_i$ to be a process object to "1".

Next, the CPU 1 executes a loop process between S007 and S010. In S007 to be the first step of this loop, the CPU 1 obtains $K_i$-piece solutions $c_{ik}$ (1<k<$K_i$) which satisfy the relation $f_i(c_{ik})=S_i$ based on the identification information signal $S_i$ corresponding to the weight coefficient C of the process object and the watermark-embedding function $f_i(x)$. In this case, it is defined that a number of solutions $c_{ik}$ for the watermark-embedding function $f_i(x)=S_i$ prepared correspondingly to the ith signal $S_i$ is $K_i$.

In S008, the CPU 1 rewrites a weight coefficient $C_i$ of the process object in the coefficient distributed picture data generated in S004 by a solution closest to the weight coefficient $C_i$ among solutions $c_{ik}$ obtained in S007.

In S009, the CPU 1 checks whether the variable i gets to L or not, namely, whether processes in S007 and S008 are applied to all signals included in the identification information. Then, when the variable i does not get to L, the CPU 1 increases the variable i, and then returns the operation to the S007.

On the contrary, when the variable i gets to L, the CPU 1 applies the above-mentioned inverse orthogonal transformation to the coefficient distributed picture rewritten in S008 so as to generate identification information watermark-embedded picture data of M×M dots.

In S012, the CPU 1 writes the identification information watermark-embedded picture data generated in S011 into the output disk unit 4. Then, the CPU 1 terminates the watermark-embedding process.

[Structure of Extracting Computer]

Figure 4:
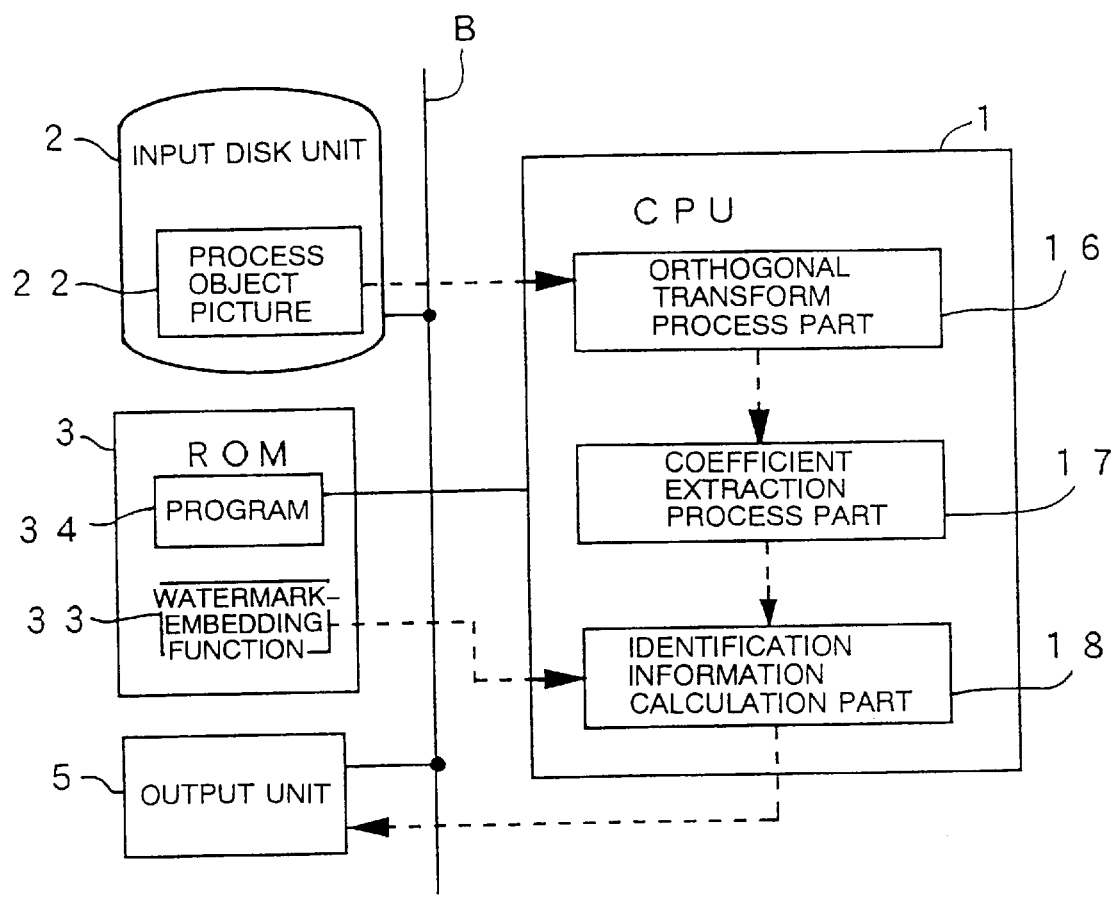
FIG. 4 is a block diagram illustrating an outline structure of an extracting computer according to the aspect of the present invention.

Next, an explanation is given of a concrete structure of the extracting computer. FIG. 4 is an outline block diagram illustrating only a structure relative to a process for extracting identification information from the identification information watermark-embedded picture data in hardware of this extracting computer. As shown in FIG. 4, the extracting computer is provided with a CPU (Central Processing Unit) 1, an input disk unit 2, a ROM (Read Only Memory) 3 and an output unit 5 which are connected one another by a bus B. That is, the hardware configuration of the extracting computer is similar to that of the watermark-embedding computer, however, there are some differences that an identification information extracting program 34 is stored in the ROM 3 and the output unit 5 is necessary but the output disk unit 4. Thus, when both the identification information watermark-embedding program 31 and the identification information extracting program 34 are stored in the ROM 3, and the output disk unit 4 and the output unit 5 are connected to the bus B. one computer can be used as the watermark-embedding computer and the extracting computer.

In FIG. 4, the input disk unit 2 inputs process object picture data (identification information watermark-embedded picture data) 22 into the CPU 1, such as a hard disk unit, a floppy disk unit and an optical magnetic disk unit.

The ROM 3 used as a watermark function hold unit and a computer readable medium is a read only memory holding an identification information extracting program 34 running in the CPU 1 and the identification information 32. This identification information 32 is just the same in the watermark-embedding computer.

Figure 5:
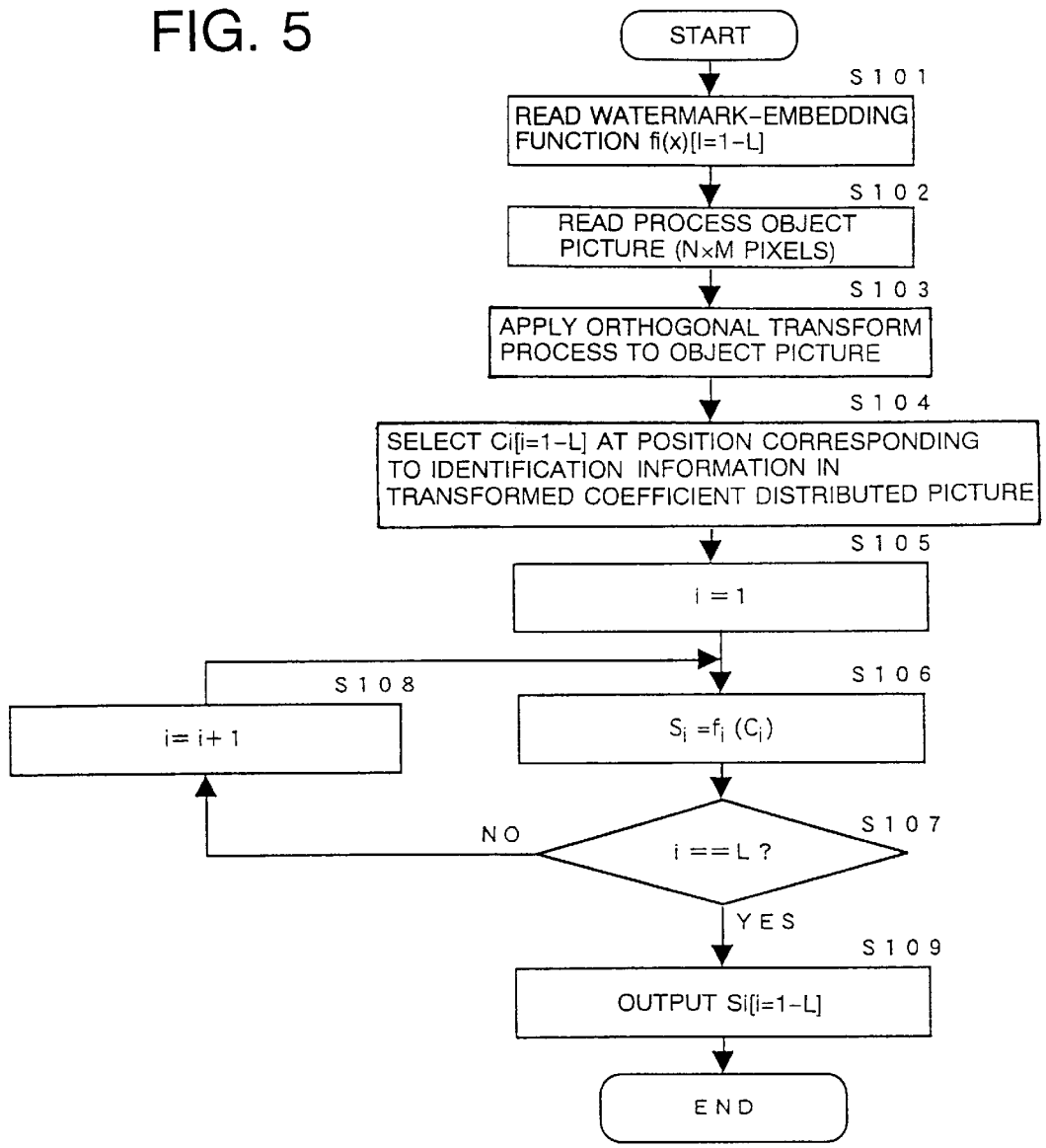
FIG. 5 is a flow chart illustrating an identification information extracting process performed by the CPU 1 in FIG. 4.

The CPU 1 is a processor controlling all of the extracting computer. The identification information extracting program 34 read from the ROM 3 runs, whereby an orthogonal transformation process part 16, a coefficient extraction process part 17 and an identification information calculation part 18 are implemented in the CPU 1, and the identification information extracting process shown in FIG. 5 is executed. Dot lines in FIG. 4 indicate data flows in the CPU 1.

The orthogonal transformation process part 16 used as an orthogonal transformation unit applies the above-mentioned orthogonal transformation to the process object picture data 22 of N×M pixels, read from the input disk unit 2, and then calculates a weight coefficient for each of N×M combinations of the basis functions. The orthogonal transformation process part 16 informs the coefficient extraction process part 17 of this coefficient distributed picture data including N×M weight coefficients.

The coefficient extraction process part 17 as a pickup unit extracts L-piece weight coefficients in which there is a possibility that signals of the identification information are watermark-embedded, and then informs the identification information calculation part 18 of them.

The identification information calculation part 18 used as a calculation unit reads a watermark-embedding function 33 from the ROM 3. The output value of the watermark-embedding function 33 is obtained every weight coefficient informed from the coefficient extraction process part 17. Then, the identification information calculation part 18 arranges each obtained output value in accordance with the arrangement in the coefficient distributed picture data of the weight coefficient corresponding to that output value, and then outputs them to the output unit 5.

The output unit 5 is a display unit for displaying L-piece output values received from the CPU 1, a printer for printing output values or the like.

FIG. 5 is a flow chart illustrating an identification information extracting process executed by the CPU 1 which has read the identification information extracting program 34. The identification information extracting process starts by inputting an identification information extracting command via a keyboard (not shown) connected to the watermark-embedding computer.

In S101 executed initially after starting the identification information extracting process, the CPU 1 reads L-piece watermark-embedding functions 33($f_i(x)$ [i=1–L]) from the ROM 3.

In S102, the CPU 1 reads the process object picture data of N×M pixels from the input disk unit 2.

In S103, the CPU 1 applies the above mentioned orthogonal transformation process to all of the process object picture data read in S102 so as to generate coefficient distributed picture data of N×M dots.

In S104, the CPU 1 selects a weight coefficient $C_i$ [i=1–L] at a position corresponding to each signal $S_i$ [i=1–L] of the identification information 32 in the watermark-embedding computer among weight coefficients included in the coefficient distributed picture data generated in S103.

In S105, the CPU 1 initializes a variable i to specify the weight coefficient $C_i$ of a process object into "1".

Next, the CPU 1 executes a loop process between S106 and S108. In S106 to be the first step of this loop, the CPU 1 obtains an output value $S_i$ for the weight coefficient $C_i$ of the watermark-embedding function $f_i(x)$ corresponding to the weight coefficient C of the process object.

In S107, the CPU 1 checks whether the variable i gets to L or not, namely, whether the process in S106 is applied to all weight coefficients to which identification information may be watermark-embedded or not. When the variable i does not yet get to L, the CPU 1 increases the variable i in S108, and then returns the process to the S106.

On the contrary, when the variable i gets to L, in S109, the CPU 1 arranges all output values $S_i$ [i=1–L] obtained in S106 in accordance with the arrangement in the coefficient distributed picture data of the corresponding weight coefficients $C_i$ [i=1–L] so as to output them to the output unit 5.

As the results, the output unit 5 can display or print data corresponding to the identification information when the process object picture data read in S102 is identification information watermark-embedded picture data.

Additionally, two-dimensional DCT (Discrete Cosine Transformation), two-dimensional DST (Discrete Sine Transformation) or two-dimensional Hadamard's Transformation maybe used as the orthogonal transformation in this aspect. Next, an explanation will be given of the concrete processes in the identification information watermark-embedding process and the identification information extracting process when two-dimensional DCT is used as the orthogonal transformation with reference to Embodiment 1.

Embodiment

In this Embodiment, an original picture data includes N×N pixels (i.e., square of pikets; only, N>>8), as shown in FIG. 10(*a*). The luminance value of each pixel in the original picture data is shown by the 0–255 gray scale. The identification information, as shown in FIG. 10(*d*), is picture data (hereinafter, called "signature picture data") showing characters "FJ" by giving a white luminance value (255) or a black luminance value (0) selectively to each of 8×8 pixels. In addition to this, the identification information watermark-embedded picture data is called "signature picture watermark-embedded picture data". Since the weight coefficient obtained by the two-dimensional DCT corresponds to the intensity (amplitude) of each frequency component in the original picture data, the above-mentioned "coefficient distributed picture data" is called "frequency distributed picture data". As the watermark-embedding function, one function f(x) applied to respective weight coefficients in common, namely, a continuous periodic function in a saw tooth shown in a graph in FIG. 10(*e*) is used.

(Identification Information Watermark-embedding Process)

Figure 6:
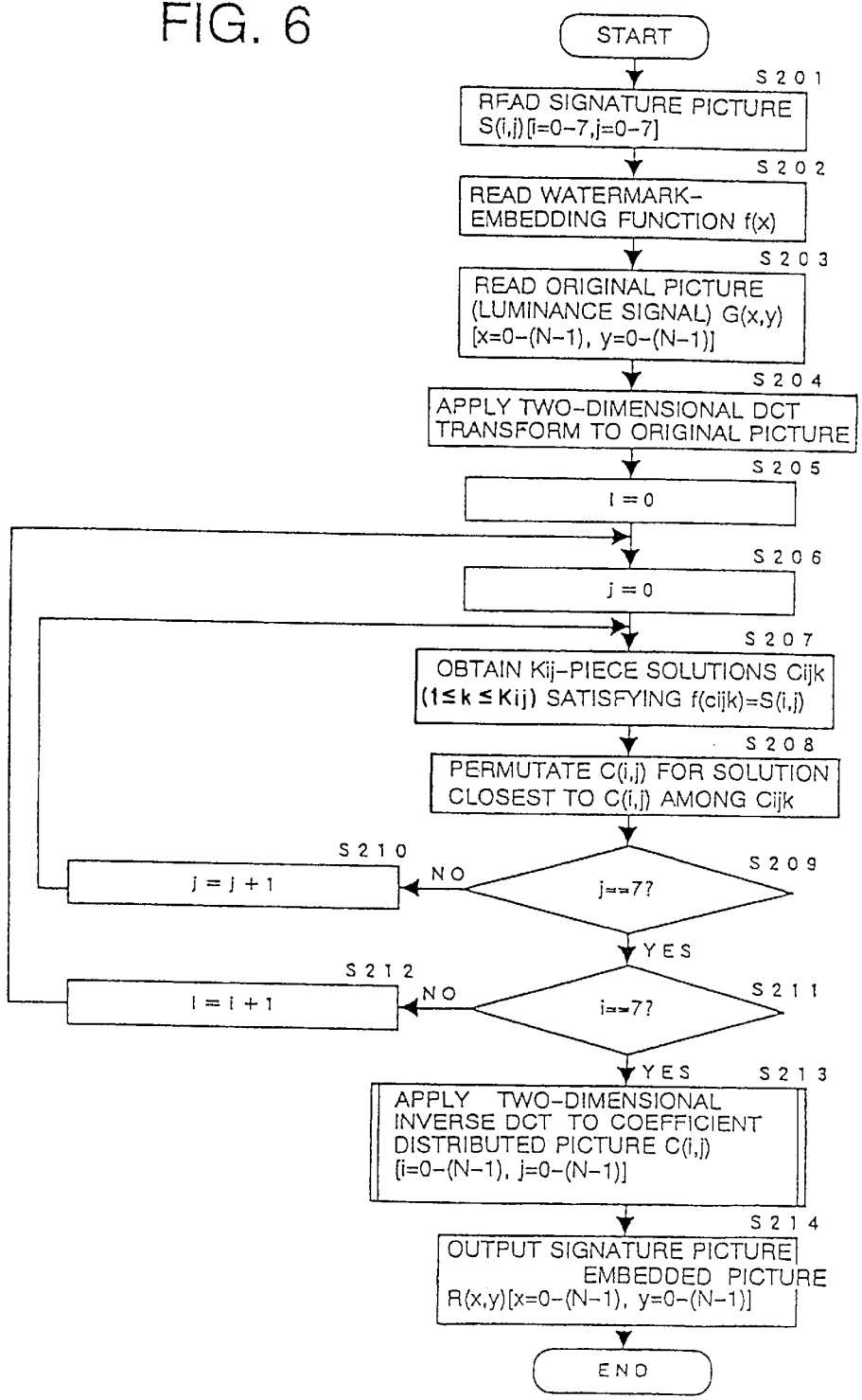
FIG. 6 is a flow chart illustrating an identification information watermark-embedding process in Embodiment 1.
Figure 8:
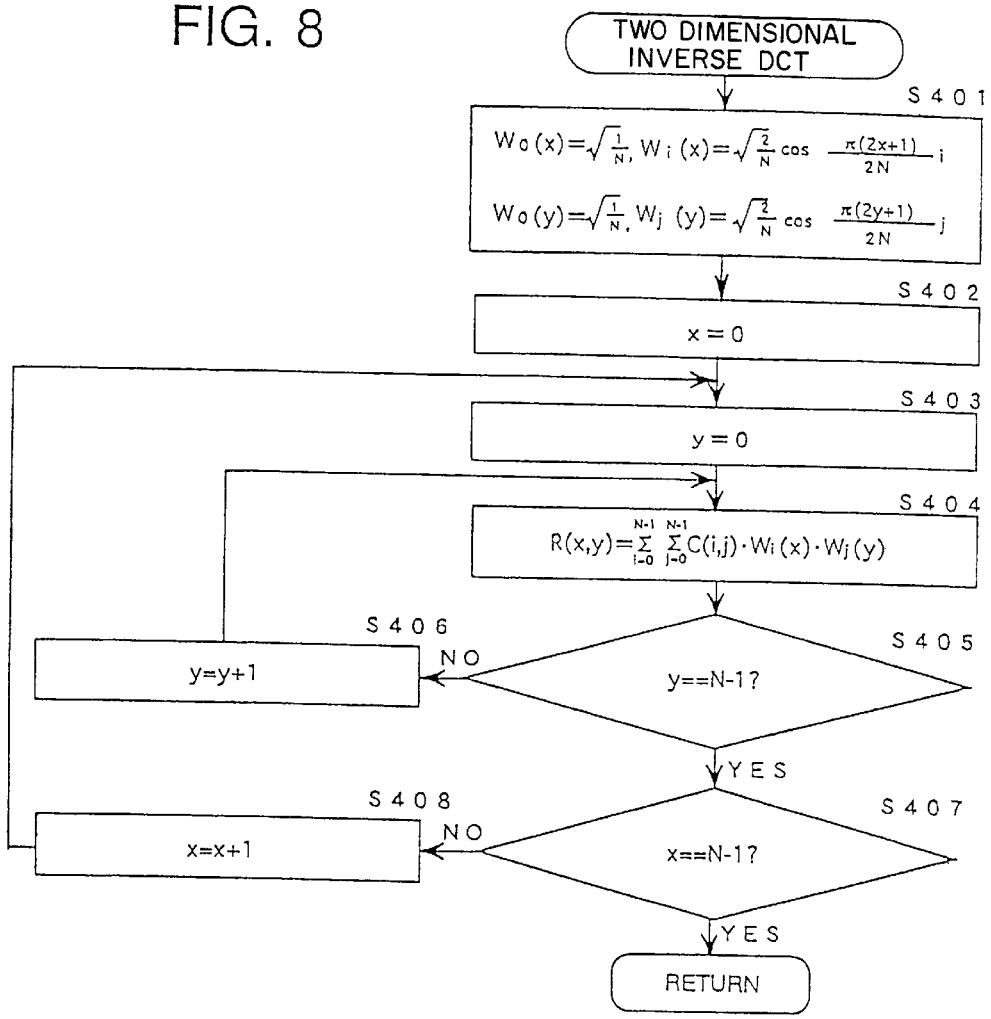
FIG. 8 is a flow chart illustrating a two-dimensional DCT process subroutine executed in S213 in FIG. 6.

FIGS. 6 and 8 are flow charts illustrating the identification information watermark-embedding process in the Embodiment.

In S201 executed initially after staring the identification information watermark-embedding process, the CPU 1 reads signature picture data S (i,j) [i=0–7, j=0–7]) from the ROM 3.

In S202, the CPU 1 reads the watermark-embedding function f(x) from the ROM 3.

In S203, the CPU 1 reads the process object picture data of N×N pixels from the input disk unit 2.

Figure 7:
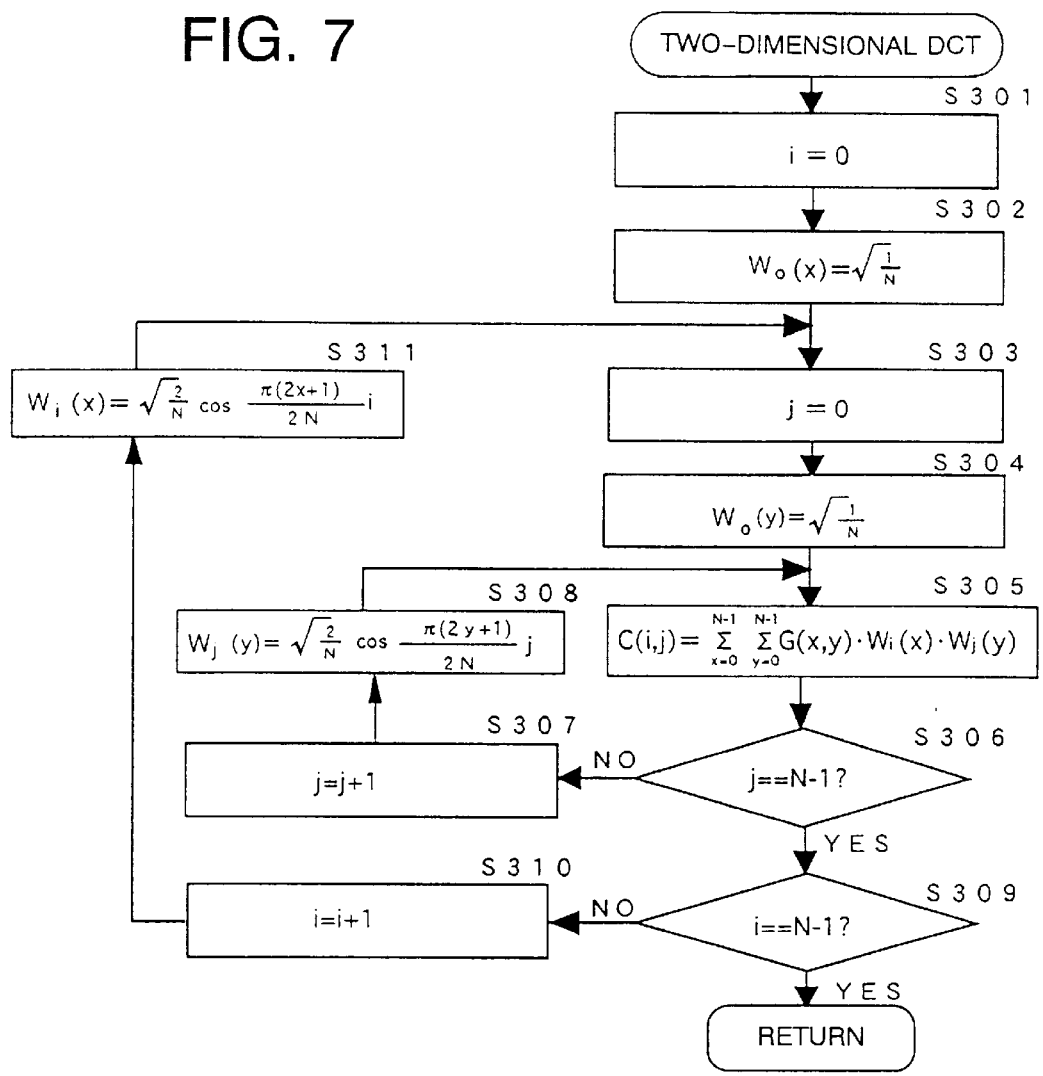
FIG. 7 is a flow chart illustrating a two-dimensional DCT process subroutine executed in S204 in FIG. 6.

In S204, the CPU 1 applies the two-dimensional DCT to all of the original picture data read in S203, and then generates frequency distributed picture data of N×N dots shown in FIG. 10(*b*). Concretely, in S204, the CPU 1 performs a two-dimensional DCT process subroutine shown in FIG. 7.

In S301 to be the first step of this two-dimensional DCT process subroutine, the CPU 1 initializes a variable i showing a column (0 is leftmost) in the frequency distributed picture data of the calculation object weight coefficient C(i,j) to be "0".

In S302, the CPU 1 sets a function $W_x(x)$ of a variable x as indicated by the following expression (2). In this expression, the variable x corresponds to a column (0 is leftmost) of each pixel in the original picture data.

$$W_o(x) = \sqrt{\frac{1}{N}} \qquad (2)$$

In S303, the CPU 1 initialize a variable j showing a row (0 is highest) in the frequency distributed picture data of the calculation object weight coefficient C(i,j) to be "0".

In S304, the CPU 1 sets a function $W_j(y)$ of a variable y as indicated by the following expression (3). In this expression, the variable y corresponds to a row (0 is highest) of each pixel in the original picture data).

$$W_o(y) = \sqrt{\frac{1}{N}} \qquad (3)$$

In S305, the CPU 1 executes the following expression (4) based on both functions $W_i(x)$ and $W_j(y)$ set at the current time and a luminance value G(x,y) of each pixel in the original picture data, and sets the calculated series as the weight coefficient C(i,j) specified by the current variables i and j.

$$C(i,j) = \sum_{x=0}^{N-1} \sum_{y=0}^{N-1} G(x,y) \cdot W_i(x) \cdot W_j(y) \qquad (4)$$

In S306, the CPU 1 checks whether the current variable j gets to (N−1) or not. When the variable j does not yet get to (N−1), the CPU 1 increases the variable j in S307. Then, the CPU 1 substitutes the current variable j to the following expression (5), and sets a new function $W_j(y)$ of a variable y again.

$$W_j(y) = \sqrt{\frac{2}{N}} \cos\frac{\pi(2y+1)}{2N} j \qquad (5)$$

Thereafter, the CPU 1 returns the process to S305, and calculates the weight coefficient C(i,j) in the next row.

On the contrary, when it is determined that the current variable j gets to (N−1) in S306, the CPU 1 advances the process to S309. In S309, the CPU 1 checks whether the current variable i gets to (N−1) or not. When the variable i does not yet get to (N−1), the CPU 1 increases the variable i in S310. Then, the CPU 1 substitutes the current variable i to the following expression (6), and sets a new function $W_i(x)$ of a variable x again.

$$W_i(x) = \sqrt{\frac{2}{N}} \cos\frac{\pi(2x+1)}{2N} i \qquad (6)$$

Thereafter, the CPU 1 returns the process to S303, and calculates the weight coefficient C(i,j) in the next column.

On the contrary, when it is determined that the current variable i gets to (N−1) in S309, the CPU 1 determines that all weight coefficients in the frequency distributed picture data are calculated, and then terminates this subroutine so as to return the process to the main routine in FIG. 6.

In the main routine in FIG. 6, the process is advanced to S205 after finishing S204. The processes between S205 and S212, as shown in FIGS. 10(b) through 10(g), are executed to pick up areas indicating DC components and areas indicating low frequency components (areas i=0–7 and j=0–7) in the frequency distributed picture data (FIG. 10(b)), and to watermark the signature picture data into those areas. The signature picture data is watermark-embedded into only weight coefficients indicating DC components and weight coefficients indicating low frequency components, because some variations of the DC components and low frequency components influence slightly on the picture quality of the signature picture watermark-embedded picture data.

In S205, the CPU 1 initializes the variable i indicating a column of the pickup object weight coefficient C(i,j) in the frequency distributed picture data and indicating a column of the reference object pixel S(i,j) in the signature picture so as to be "0".

In S206, the CPU 1 initializes the variable j indicating a row of the pickup object weight coefficient C(i,j) in the frequency distributed picture data and indicating a row of the reference object pixel S(i,j) in the signature picture so as to be "0".

In S207, the CPU 1 reads the signature image data (FIG. 10(d)) and the watermark-embedding function f(x) (FIG. 10(e)) from the ROM 3, and then obtains all input values $c_{ijk}$ of the watermark-embedding function f(x) which takes a luminance value of the reference object pixel S(i,j) in the signature picture data specified by the current variables i and j for an output value. That is, all of $K_{ij}$-piece solutions $c_{ijk}$ ($1 \leq k \leq K_{ij}$) which satisfy $f(c_{ijk})=S(i,j)$ are obtained. Here, it is defined that the number of the solutions $c_{ijk}$ for $f(c_{ijk})=S(i,j)$ is $K_{ij}$.

In S208, the CPU 1 selects an input value which is closest to the pickup object weight coefficient C(i,j) specified by the current variables i and j among all input values $c_{ijk}$ obtained in S207. Then, the CPU 1 permutates the pickup object weight coefficient C(i,j) specified by the current variables i and j for the selected input value (see FIG. 10(f)).

In S209, the CPU 1 checks whether the current variable j gets to "7" or not. When the variable j does not yet get to "7", the CPU 1 increases the variable j in S210, and then returns the process to S207 to permutate the weight coefficient C(i,j) in-the next row.

On the contrary, when it is determined that the current variable j gets to "7" in S209, the CPU 1 advances the process to S211. In S211, the CPU 1 checks whether the current variable i gets to "7" or not. When the variable i does not yet get to "7", the CPU 1 increases the variable i in S212 and then returns the process to S206 to permutate the weight coefficient C(i,j) of the next column.

On the contrary, when it is determined that the current variable i gets to "7" in S211, the CPU 1 advances the process to S213. In S213, the CPU 1 applies the two-dimensional inverse DCT to all frequency distributed picture data (FIG. 10(g)) including the weight coefficient C(i,j) of which the value is permutated in S208 so as to generate the signature picture watermark-embedded picture data of N×N dots shown in FIG. 10(h). Concretely, in S213, the CPU 1 performs the two-dimensional inverse DCT process subroutine shown in FIG. 8.

In S401 to be the first step of this two-dimensional inverse DCT process subroutine, the CPU 1 defines functions used for this process like the following expressions (7)–(10).

$$W_o(x) = \sqrt{\frac{1}{N}} \qquad (7)$$

$$W_i(x) = \sqrt{\frac{2}{N}} \cos\frac{\pi(2x+1)}{2N} i \qquad (8)$$

$$W_o(y) = \sqrt{\frac{1}{N}} \qquad (9)$$

$$W_j(y) = \sqrt{\frac{2}{N}} \cos\frac{\pi(2y+1)}{2N} j \qquad (10)$$

In S402, the CPU 1 initializes the variable x indicating a column (0 is leftmost) in the signature picture watermark-embedded picture data of the calculation object pixel R(x,y) so as to be "0".

In S403, the CPU 1 initializes the variable y indicating a row (0 is highest) in the signature picture watermark-embedded picture data of the calculation object pixel R(x,y) so as to be "0".

In S404, the CPU 1 calculates the luminance value of the pixel R(x,y) in the signature picture watermark-embedded picture data specified by the current variables x and y. Concretely, the CPU 1 substitutes the current variable x to the function of the expression (8) defined in S401, and substitutes the current variable y to the function of the expression (10) defined in S401. Moreover, the CPU 1 executes the following expression (11) based on the functions of the substituted expressions (8) and (10) and the functions of the expressions (7) and (9) defined in S401, and then sets the calculated series as the luminance value of the pixel R (x,y) specified by the current variables x and y.

$$R(x, y) = \sum_{i=0}^{N-1} \sum_{i=0}^{N-1} C(i, j) \cdot W_i(x) \cdot W_j(y) \qquad (11)$$

In S405, the CPU 1 checks whether the current variable y gets to (N−1) or not. When the variable y does not get yet to (N−1), the CPU 1 increases the variable y in S406, and then returns the process to S404 so as to calculate the luminance value of the pixel R (x,y) in the next row.

On the contrary, when it is determined that the current variable y gets to (N−1) in S405, the CPU 1 advances the process to S407. In S407, the CPU 1 checks whether the current variable x gets to (N−1) or not. When the variable x does not yet get to (N−1), the CPU 1 increases the variable x in S408, and then returns the process to S403 so as to calculate the luminance value of pixel R (x,y) in the next column.

On the contrary, when it is determined that the current variable x gets to (N−1) in S407, the CPU 1 determines that all luminance value of pixels in the signature picture watermark-embedded picture data are calculated, and then terminates this subroutine to return the process to the main routine in FIG. 6.

In the main routine in FIG. 6, the process is advanced to S214 after finishing S213. In S214, the CPU 1 outputs the signature picture watermark-embedded picture data of N×N pixels to the output disk unit 4.

(Identification Information Extracting Process)

FIG. 9 is a flow chart illustrating an identification information extracting process in the Embodiment.

In S501 to be the first step of this identification information extracting process, the CPU 1 reads the watermark-embedding function f(x) from the ROM 3.

In S502, the CPU 1 reads the process object picture data of N×N pixels shown in FIG. 11(a) from the input disk unit 2.

In S503, the CPU 1 applies the two-dimensional DCT to all process object picture data read in S502 so as to generate the frequency distributed picture data of N×N pixels shown in FIG. 11(b). Concretely, the CPU 1 calculates the two-dimensional DCT subroutine shown in FIG. 7.

In the processes S504 through S510, as shown in FIGS. 11(b) through 11(e), areas indicating DC components and areas indicating low frequency components (area of i=0–7 and j=0–7) (FIG. 11(c)) in the frequency distributed picture data (FIG. 11(b)) are picked up, and the signature picture data is extracted from those areas.

In S504, the CPU 1 initializes the variable i indicating a column of the pickup object weight coefficient C (i,j) in the frequency distributed picture data so as to be "0".

In S505, the CPU 1 initialize the variable j indicating a row of the pickup object weight coefficient C (i,j) in the frequency distributed picture data so as to be "0".

In S506, the CPU 1 reads a watermark-embedding function (FIG. 11(d) equal to FIG. 10(e)), and then substitutes the extraction object weight coefficient C (i,j) specified by the current variables i and j i.e., evaluates the watermark-embedding function at the value C(i,j) so as to calculate an output value S'(i,j) of the ith column and the jth row.

In S507, the CPU 1 checks whether the current variable j gets to "7" or not. When the variable j does not yet get to "7", the CPU 1 increases the variable j in S208, and then returns the process to S506 to calculate the output value S' in the next column.

On the contrary, when it is determined that the current variable j gets to "7" in S507, the CPU 1 advances the process to S509. In S509, the CPU 1 checks whether the current variable i gets to "7" or not. When the variable i does not yet get to "7", the CPU 1 increases the variable i in S510, and then returns the process to S505 to calculate the output value S'(i,j) in the next column.

On the contrary, when it is determined that the current variable i gets to "7" in S509, the CPU 1 advances the process to S511. In S511, the CPU 1 outputs output values (luminance values) of i×j dots calculated in S506 to the output unit 5. At that time, when the process object picture data is the signature picture watermark-embedded picture data, that picture data is the same picture data (FIG. 11(e)) as the signature picture (FIG. 10(d)).

According to the present invention, it is possible to watermark identification information into an original picture data without deteriorating the picture quality of the picture data so as not to be recognized by a third person. Further, it is also possible to extract the watermark-embedded identification information without the original picture data. Thus, since it is unnecessary to keep and manage original picture data for a right holder or the like of picture data, no mass storage unit is needed.

This invention being thus described, it will be obvious that same may be varied in various ways. Such variations are not to be regarded as departing from the spirit and scope of the invention, and all such modifications as would be obvious for one skilled in the art are intended to be included within the scope of the following claims.

What is claimed is:

1. A method of watermark-embedding identification information into original picture data comprising a plurality of pixel values, the identification information comprising numerical signals representing respective identification values, the method comprising:

generating combinations of mutually orthogonal basis functions for the identification values;

calculating corresponding weight coefficients for each of the combinations, each weight coefficient further corresponding to a basis function of the corresponding combination and being calculated based on a sum of products respectively corresponding to the pixels, each product being calculated by multiplying the pixel value of the pixel and a value of the basis function at a position of the pixel within the original picture data;

specifying for each identification value corresponding input values for a watermark-embedding function defined as a multi-to-one function having a domain comprising the weight coefficients and a range comprising the identification values, each specified input value being closest to a corresponding weight coefficient of the identification value among plural input values mapped to the identification value by the multi-to-one function; and changing the weight coefficients to values equal to the corresponding specified input values by changing pixel values in the original picture data.

2. A method of extracting identification information from process object picture data into which identification information is watermark-embedded by the watermark-embedding method according to the claim 1, said extracting method comprising:

generating combinations of mutually orthogonal basis functions respectively corresponding to the identification values;

calculating corresponding weight coefficients for each of the respective combinations, each calculated weight coefficient further corresponding to a basis function of the combination and being based on a sum of products respectively corresponding to pixels of the process object picture data, each product being calculated by multiplying a pixel value of the pixel and a value of the basis function at a corresponding pixel position within the original picture data; and calculating for each weight coefficient a value of a watermark-embedding function defined as a multi-to-one function having a domain comprising the weight coefficients and a range comprising the identification values.

3. An extracting method according to claim 2, wherein the watermark-embedding function is a periodic function.

4. An extracting method according to claim 2, wherein the watermark-embedding function is a continuous periodic function.

5. An identification information watermark embedding method according to claim 2, wherein the watermark-embedding function transforms an interval between two input values into an image interval when the watermark-embedding function maps the two input values to a same output value, the image interval being narrow when the two input values are small and being broad when the two input values are large.

6. A watermark-embedding method according to claim 1, wherein the watermark-embedding function is a periodic function.

7. A watermark-embedding method according to claim 1, wherein the watermark-embedding function is a continuous periodic function.

8. A watermark-embedding method according to claim 1, wherein the watermark-embedding function transforms an interval between two input values into an image interval when the watermark embedding function maps the two input values to a same output value, the image interval being narrow when the two input values are small and being broad when the two input values are large.

9. A method of watermark-embedding identification information into original picture data comprising a plurality of pixel values, the identification information comprising numerical signals representing identification values, the method comprising:

applying orthogonal transformation to the plurality of pixel values, and generating a plurality of weight coefficients;

designating weight coefficients for each of the identification values, the designated weight coefficients being selected from the plurality of weight coefficients;

specifying for the weight coefficients of each identification value corresponding input values for a watermark-embedding function defined as a multi-to-one function having a domain comprising the weight coefficients and a range comprising the identification values, each specified input value being closest to the corresponding weight coefficient among plural input values mapped to the identification value by the multi-to-one function, and permutating the designated weight coefficients by the corresponding specified input values; and applying inverse orthogonal transformation to the plurality of weight coefficients after permutating the weight coefficients corresponding to all the identification values.

10. A method of extracting identification information from process object picture data to which the identification information is watermark-embedded by the watermark-embedding method according to claim 9, the extracting method comprising:

applying orthogonal transformation to pixel values of the process object picture data and generating of a plurality of weight coefficients;

selecting weight coefficients corresponding to the identification values from the plurality of weight coefficients; and calculating for each selected weight coefficient a value of a corresponding watermark-embedding function defined as a multi-to-one function having a domain comprising the weight coefficients and having a range comprising the identification values.

11. A method of watermark-embedding identification information into original picture data comprising a plurality of pixel values, the identification information comprising numerical signals representing identification values, the method comprising:

applying two-dimensional discrete cosine transformation to the plurality of pixel values, and generating a plurality of weight coefficients;

designating weight coefficients for each of the identification values, the designated weight coefficients being selected from the plurality of weight coefficients;

specifying for the designated weight coefficients of each identification value corresponding input values for a watermark-embedding function defined as a multi-to-one function having a domain comprising the weight coefficients and a range comprising the identification values, each specified input value being closest to the corresponding weight coefficient among plural input values mapped to the identification value by the watermark-embedding function, and permutating the weight coefficients; and applying inverse two-dimensional discrete cosine transformation to the plurality of weight coefficients after permutating the weight coefficients corresponding to all the identification values.

12. A method of extracting identification information from process object picture data into which identification information is watermark-embedded by the watermark-embedding method according to claim 11 the extracting method comprising:

applying two-dimensional discrete cosine transformation to pixel values of the process object picture data, and generating a plurality of weight coefficients;

selecting weight coefficients corresponding to the identification values from the plurality of weight coefficients; and calculating for each selected weight coefficient a value of a watermark-embedding function defined as a multi-to-one function having a domain comprising the weight coefficients and having a range comprising the identification values.

13. A watermark-embedding apparatus for watermark embedding identification information into original picture data comprising a plurality of pixel values, the identification information comprising numerical signals representing identification values, said watermark-embedding apparatus comprising:

watermark-embedding function hold means for holding a watermark-embedding function defined as a multi-to-one function having a domain comprising a set of weight coefficients and having a range comprising the identification values;

orthogonal transformation means for applying orthogonal transformation to the plurality of pixel values, and generating a plurality of weight coefficients comprised in the set of weight coefficients;

weight coefficient permutation means for designating weight coefficients from the plurality of weight coefficients for each identification value, specifying for each designated weight coefficient a corresponding input value closest to the weight coefficient among plural input values mapped to the identification value by the watermark-embedding function, and permutating each designated weight coefficient by the corresponding specified input value; and inverse orthogonal transformation means for applying inverse orthogonal transformation to the plurality of weight coefficients after permutation of the designated weight coefficients.

14. An extracting apparatus for extracting identification information from process object picture data in which the identification information is watermark-embedded by the watermark-embedding apparatus according to claim 13, said extracting apparatus comprising:

watermark-embedding function hold means for holding a watermark-embedding function defined as a multi-to-one function having a domain comprising a set of weight coefficients and a range comprising the identification values;

orthogonal transformation means for applying orthogonal transformation to pixel values of the process object picture data and generating therefrom a plurality of weight coefficients;

means for selecting weight coefficients corresponding to the identification values from the plurality of weight coefficients; and calculation means for calculating a value of the watermark-embedding function for each of the selected weight coefficients.

15. A computer readable medium storing a program to control a computer, said program comprising instructions for:

applying orthogonal transformation to a plurality of pixel values and generating a plurality of weight coefficients;

designating weight coefficients from the plurality of weight coefficients for each of plural identification values represented by respective numerical signals;

specifying for the designated weight coefficients of each identification value corresponding input values for a watermark-embedding function defined as a multi-to-one function having a domain comprising the plurality of weight coefficients and having a range comprising the identification values, and permutating the designated weight coefficients in the plurality of weight coefficients by the corresponding specified input values, each specified input value being mapped to the identification value by the multi-valued function and being closest to the corresponding weight coefficient among plural input values mapped to the identification value by the watermark-embedding function; and applying inverse orthogonal transformation to the plurality of weight coefficients after permutating the designated weight coefficients for all the identification values.

16. A computer readable medium storing a program to control a computer, said program comprising instructions for:

applying orthogonal transformation to a plurality of pixel values of process object picture data into which identification information is watermark-embedded, and generating a plurality of weight coefficients;

selecting from the plurality of weight coefficients corresponding weight coefficients for each of plural numerical signals representing respective specified values; and for each selected weight coefficient, determining a corresponding domain value of a watermark-embedding function defined as a multi-to-one function having a domain comprising the plurality of weight coefficients, having a range comprising the specified values, and mapping each selected weight coefficient to the corresponding specified value; and modifying the plurality of pixel values based on the determined domain values to output identification data.

17. A computer readable medium storing a program to control a computer, said program comprising instructions for:

applying orthogonal transformation to a plurality of pixel values of original picture data, and generating a plurality of weight coefficients;

selecting from the plurality of weight coefficients corresponding weight coefficients for each of plural numerical signals representing respective identification values; and for each selected weight coefficient, determining a corresponding domain value of a watermark-embedding function defined as a multi-to-one function having a domain comprising the plurality of weight coefficients, having a range comprising the specified values, and mapping each selected weight coefficient to the corresponding identification value; and modifying the plurality of pixel values based on the determined domain values to output watermark-embedded picture data.

\* \* \* \* \*

UNITED STATES PATENT AND TRADEMARK OFFICE
CERTIFICATE OF CORRECTION

PATENT NO.: 6,104,826
DATED : August 15, 2000
INVENTOR(S): Akira NAKAGAWA, et al.

It is certified that errors appear in the above-identified patent and that said Letters Patent is hereby corrected as shown below:

Col. 20, line 30, after "generating" delete "of".

Col. 21, line 2, after "claim 11" insert --,--.

Signed and Sealed this

Twenty-fourth Day of April, 2001

Attest:

NICHOLAS P. GODICI

Attesting Officer     Acting Director of the United States Patent and Trademark Office